United States Patent [19]

Fedder et al.

[11] 4,383,755
[45] May 17, 1983

[54] UNITARY, MODULAR, DEMOUNTABLE OPTICAL SYSTEM FOR LASER DIODE/PRINTING COPYING APPARATUS

[75] Inventors: Richard C. Fedder, Longwood; George C. Schafner, Orlando; Thomas Robson, Orlando; Thomas F. McMahon, Orlando, all of Fla.

[73] Assignee: Burroughs Corporation, Orlando, Fla.

[21] Appl. No.: 338,558

[22] Filed: Jan. 11, 1982

[51] Int. Cl.³ .......................................... G03G 15/04
[52] U.S. Cl. ..................... 355/11; 350/6.8; 355/8; 358/285; 358/300
[58] Field of Search .............. 355/11, 8, 3 R; 358/285, 293, 300; 350/6.8; 346/160

[56] References Cited
U.S. PATENT DOCUMENTS 3,995,110 11/1976 Starkweather .................. 350/6.8 X
4,046,471 9/1977 Branham ............................ 355/3 R
4,205,348 5/1980 DeBenedictis .................. 358/293 X
4,308,544 12/1981 Lucero et al. ................... 350/6.8 X Primary Examiner—R. L. Moses
Attorney, Agent, or Firm—Carl Fissell, Jr.; Kevin R. Peterson; David Rasmussen

[57] ABSTRACT

A self contained, demountable, unitary modular optical system for a Solid State Laser Diode Printer/Copier utilizes a folded light beam path whereby laser light is collimated through a compound four element collimating objective lens assembly, passed through a cylindrical lens focussing the beam to a horizontal line image onto the facets of a rotatable polygon mirror assembly. The beam is then passed through a cylindrical meniscus lens focussing the beam to a small dimension in the scanning or horizontal direction. A pair of cylindrical-spherical lenses with the corresponding centers of the cylindrical and spherical surfaces located near the facet of the polygon provide cross-scan focussing in the vertical direction as well as approximating a pair of toridal lenses. Horizontal and vertical spot size can thus be independently focussed.

10 Claims, 7 Drawing Figures

FIG. 2. FIG. 3. LASER DIODE OPTICAL SCANNING SYSTEM
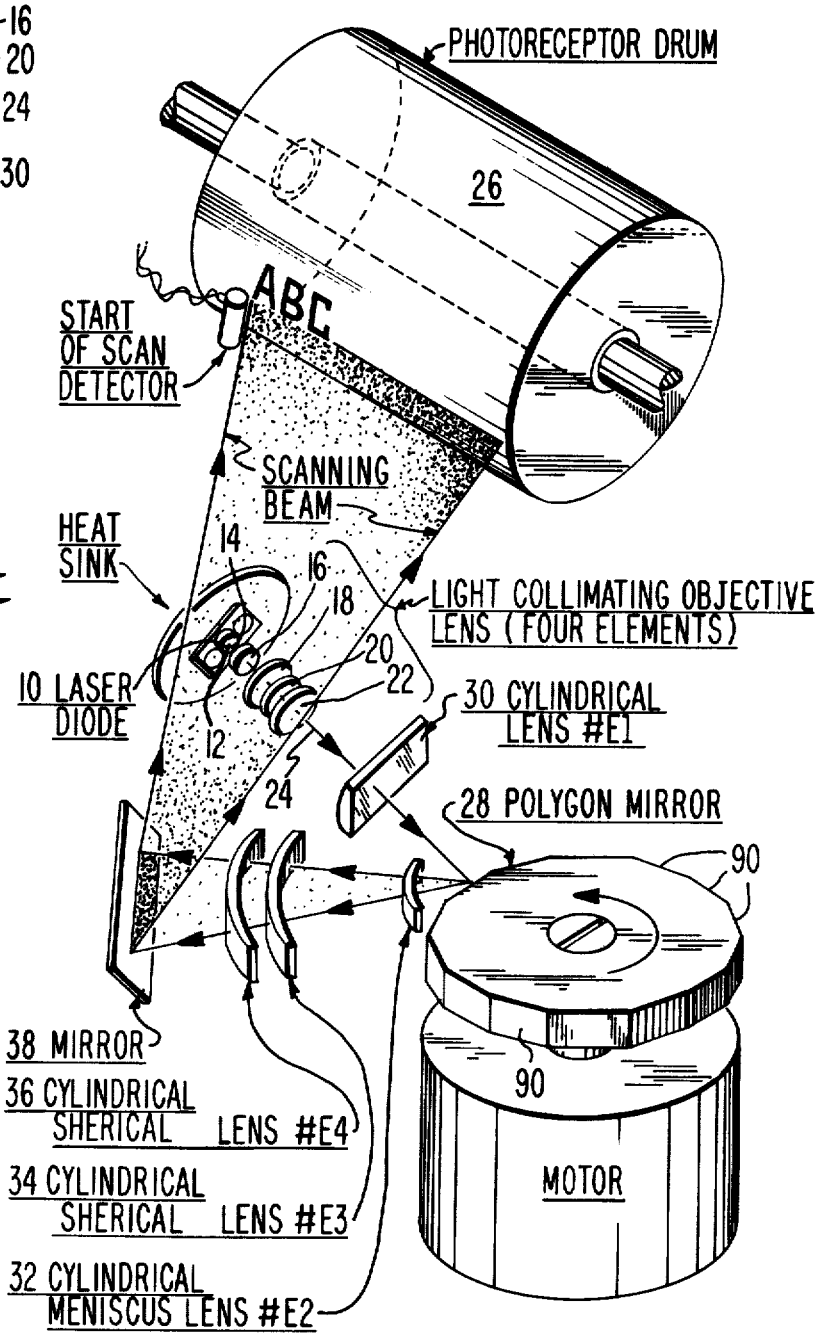

UNITARY, MODULAR, DEMOUNTABLE OPTICAL SYSTEM FOR LASER DIODE/PRINTING COPYING APPARATUS

This application is related to co-pending application U.S. Ser. No. 276,260, filed June 23, 1981, entitled "Optical Scanning and Imaging System Utilizing Laser Diode" in the name of R. C. Fedder, et al assigned to the same assignee as the present invention.

BACKGROUND OF THE INVENTION

1. Field of the Invention

This invention relates to printing/copying apparatus and, more particularly, to printing/copying apparatus utilizing a solid state laser diode to generate an intense beam of coherent light, and specifically relates to a novel, unitary, modular, demountable optical system for producing a precisely defined, accurately located, high definition/resolution moving spot of light from a rotating mirror onto a rotatable photocopy drum.

2. Description of the Prior Art

A number of techniques and apparatus have been suggested for use in laser printing copying. Each has certain characteristics which recommend it for a specific application. Obviously, the goal is to provide a type of printing/copying device which accommodates a variety of purposes and performs these functions effectively and efficiently.

The following patents are considered to be pertinent to the present invention which is considered to be an improvement thereover, as well as an improvement over the earlier filed application U.S. Ser. No. 276,260, as will be described later on herein.

Fleischer, U.S. Pat. No. 3,750,189 shows and describes a helium-neon laser scanner whose light output is coupled through a lens system to a rotating polygon mirror from which the light is reflected through a lens system to a rotating drum. In the Fleischer structure a cylindrical lens is employed to focus the collimated beam of light to a line on a flat facet of the polygon mirror while a second cylindrical or toric lens after the polygon is used to recollimate the light reflected from the polygon. A spherical lens then focusses the recollimated light beam to a small spot on the scan line of the photocopy drum.

For appreciable scan angles it is necessary to use a toroid in order to maintain the spot size over the scan line. However, toroidal lenses are relatively difficult to manufacture and are therefore usually not economically or commercially feasible due to their high cost.

Grafton, U.S. Pat. No. 3,946,150 employs a cylindrical lens near the photo receptor. This proximity requires the use of a long cylindrical lens. Also, since this lens is located close to the developer unit it tends to become coated with toner which degrades the light and resulting photocopy.

Rabedeau, U.S. Pat. No. 4,123,135 is stated to be an improvement over the apparatus described in Fleischer, U.S. Pat. No. 3,750,189. Rabedeau notes that the beam entering the spherical lens need not be collimated. Rabedeau makes use of this by employing a negative cylindrical lens with power in the scan direction following the polygon to produce the same beam divergence in both azimuths for the beam that enters the spherical focussing lenses. The method and structure permits the use of less expensive cylindrical lenses but also tends to flatten the field. However, it remains a very difficult problem to flatten the field over wide angles when relatively high resolution is required.

SUMMARY OF THE INVENTION

The present invention overcomes the above difficulties first, by providing a cylindrical meniscus lens with power in the horizontal scan direction to focus the beam to a small spot in the scan direction. Second, by providing a pair of cylindrical-spherical lenses to provide cross-scan or vertical focus. The cylindrical-spherical lenses provide a function similar to a pair of toric lenses but at a more reasonable cost. For the laser diode scanning system of the present invention it is also an advantage to have the horizontal and vertical focus independent.

The optical system of the present invention is structured and fabricated as demountable, unitary, modular assembly independent of the remainder of the apparatus with which it is or may be operably associated. The lens assemblies of the optical system, once adjusted for focus, are fixed in position within the module although each lens is in fact demountable for replacement without the need for realignment upon reinsertion in the assembly. The module is sealed against dust and dirt contamination and is provided with its own source of pressurized air to prevent dust and dirt from accumulating within the assembly from one source or another. Additionally the module is angularly adjustably positionable relative to the photoreceptor drum and includes means for preventing accidental ingress of toner into the optical module. Precisely located pivot pins enable accurate adjustment of the optics relative to the photoreceptor drum which, once fixed in position, need no further adjustment or alteration.

BRIEF DESCRIPTION OF THE DRAWINGS

FIG. 2 is an unfolded schematic representation of the light beam formation as it passes through different lens assemblies in the apparatus of the present invention;

FIG. 3 is a perspective view, not to scale, of the apparatus of the present invention;

DESCRIPTION OF THE PREFERRED EMBODIMENT

Figure 1:
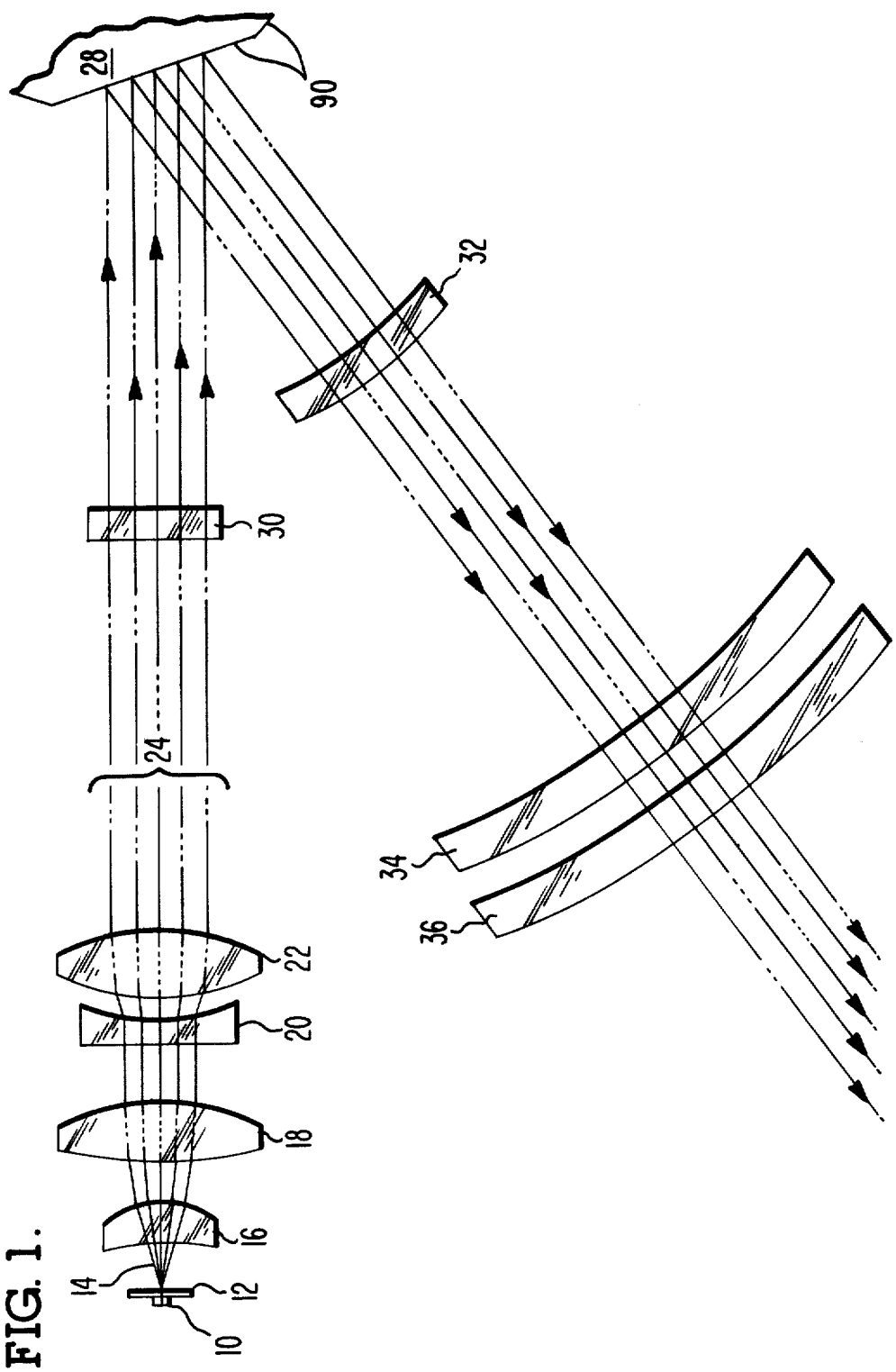
FIG. 1 is a schematic representation, not to scale, of the light beam path for the apparatus incorporating the present invention.

Briefly, as seen in the highly schematic, views of FIGS. 1 and 2 a laser diode 10 mounted behind a sapphire window 12 is pulsed by a driver circuit (not shown) which is fed from the imaging electronics operably coupled to the present apparatus and also not shown herein. The logic is set up such that the laser diode is "off" when intelligible characters or other information is to be printed. Solid state laser diodes of the double heterostructure variety produce a diverging beam of light when pulsed by the driver circuit and therefore, requires collimated optics.

Light rays 14 emitted from the laser diode 10 are first collected and collimated by a four element objective lens assembly the elements of which are designated 16, 18, 20 and 22 respectively, provided with spherical elements. The first two lenses act as converging or positive elements and collect the light with minimum aberration while the third objective element 20 is a diverging lens that compensates the residual aberration from the other three elements. Collimated light 24 emerges from fourth element 22 when the facet of the laser diode chip 10 is located at the focal point of the objective lens assembly. The collimated beam 24 now has an elliptical shape corresponding to the differing divergence angles of the beam from the laser diode 10 in planes parallel and perpendicular to the junction of the diode. It is noted that a three element objective lens could be employed in place of the present four element lens assembly with suitable choice of glasses.

The collimated laser beam 24 is then scanned and focussed onto a rotatable photoreceptor drum 26, FIGS. 2 and 3 by means of a polygon scanner assembly 28 and a set of four lens elements designed herein after. An additional function of the four lens set is to correct for the pyramidal angle variation or the variation in the angle between the facets of the polygon and the axis of rotation. Without this correction the laser scan lines on the drum 26 would not overlap uniformly from one scan line to the next. Since the light from the laser diode 10 discharges the surface potential or white space between the latent images of characters and or intelligible information, the variable overlap of scan lines would cause a variation in the discharge of the potential therefore and cause lines to appear in the "white" space of the toned image.

The above variation in scan line overlap is reduced in the following manner. First, the collimated beam 24 is focussed in the cross scan direction by a first cylindrical lens 30 to form a line image on the facet of the polygon 28. Lenses that follow the polygon 28 focus the beam to a small spot on the photoreceptor 26.

If the line of focus is strictly in the plane of the facet, then rotation of the facet about that focus line would produce no movement of the subsequently focussed spot on the photoreceptor 26. In practice, however, the correction for pyramidal angle error is not absolute and the focussed spot will move slightly in the cross scan direction as a line cannot be perfectly focussed on the facet for all positions. Following the polygon 28 a cylindrical meniscus lens 32 serves to focus the beam to a small dimension in the scanning or horizontal direction. By appropriately curving or bending this lens the field of the horizontal focus can be flattened and the aberration can be minimized. This lens interacts very weakly with the vertical or cross scan focus since the power is negligible in that direction. The cross scan or vertical focussing is achieved by a pair of cylindrical-spherical lenses 34 and 36 with the corresponding centers of the cylindrical and spherical surfaces located near the facet and with power mainly in the vertical or cross scan direction. Thus, abberations in the vertical direction are reduced and the field is flattened in the scan direction first by using a pair of lenses and second by bending or curving the lenses slightly in the horizontal direction. It can be shown from thin lens theory that the index of refraction of the glass in the pair should be greater than 1.62 to have a finite separation between the pair. Flint glasses such as SF6 have a high index of refraction and allow a comfortable space between the pair. One novel aspect of this optical combination is that the pair approximates a pair of toroidal lenses which have been used in the prior art but which are expensive to manufacture. Another novel aspect is that the horizontal and vertical spot size can be focussed independtly. Finally, a mirror 38, FIG. 3 bends the light at a suitable angle to cause the light to impinge upon the surface of drum 26.

Figure 4:
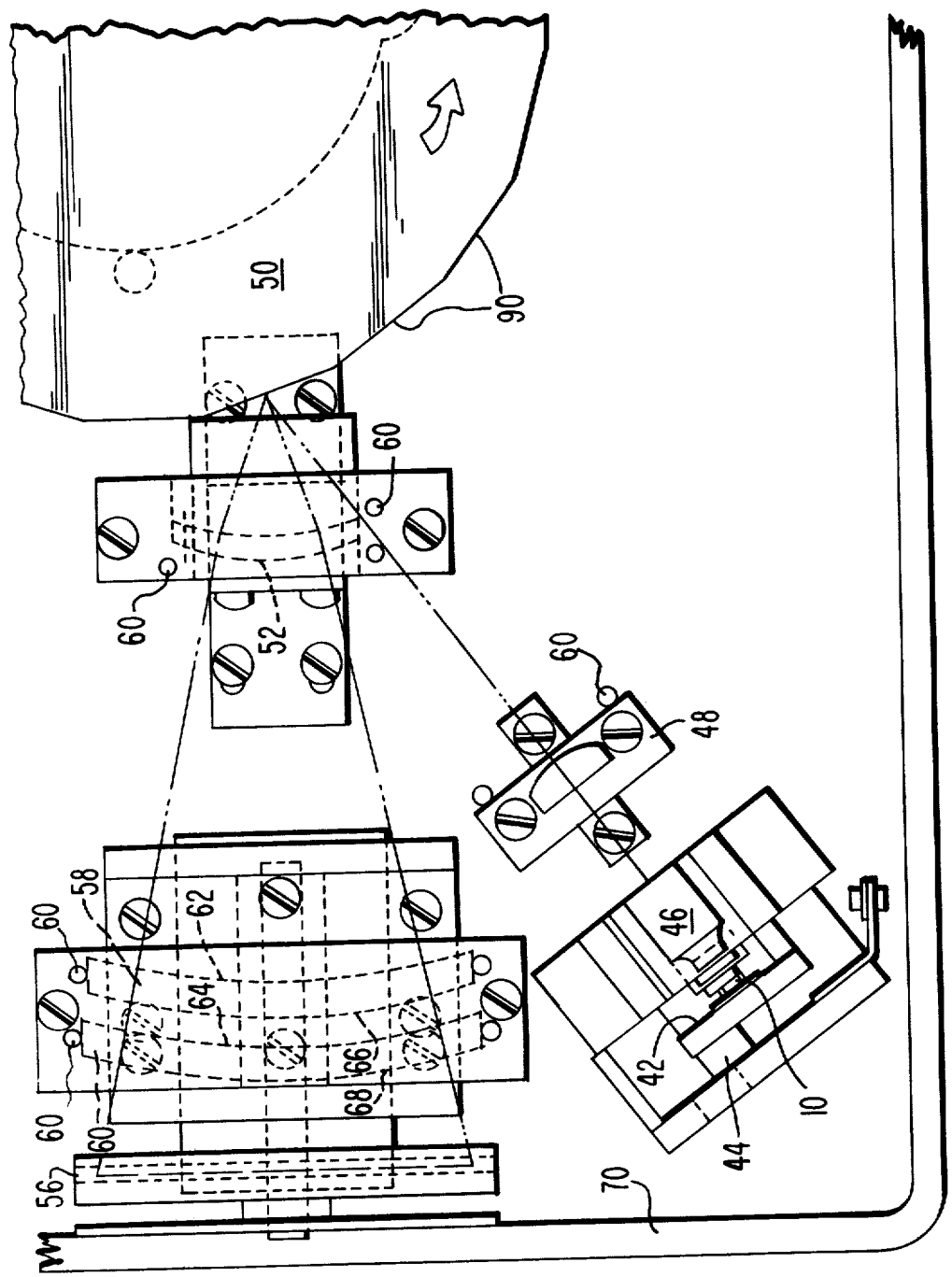
FIG. 4 is a partial top plan view of apparatus incorporating the present invention.
Figures 5, 5A:
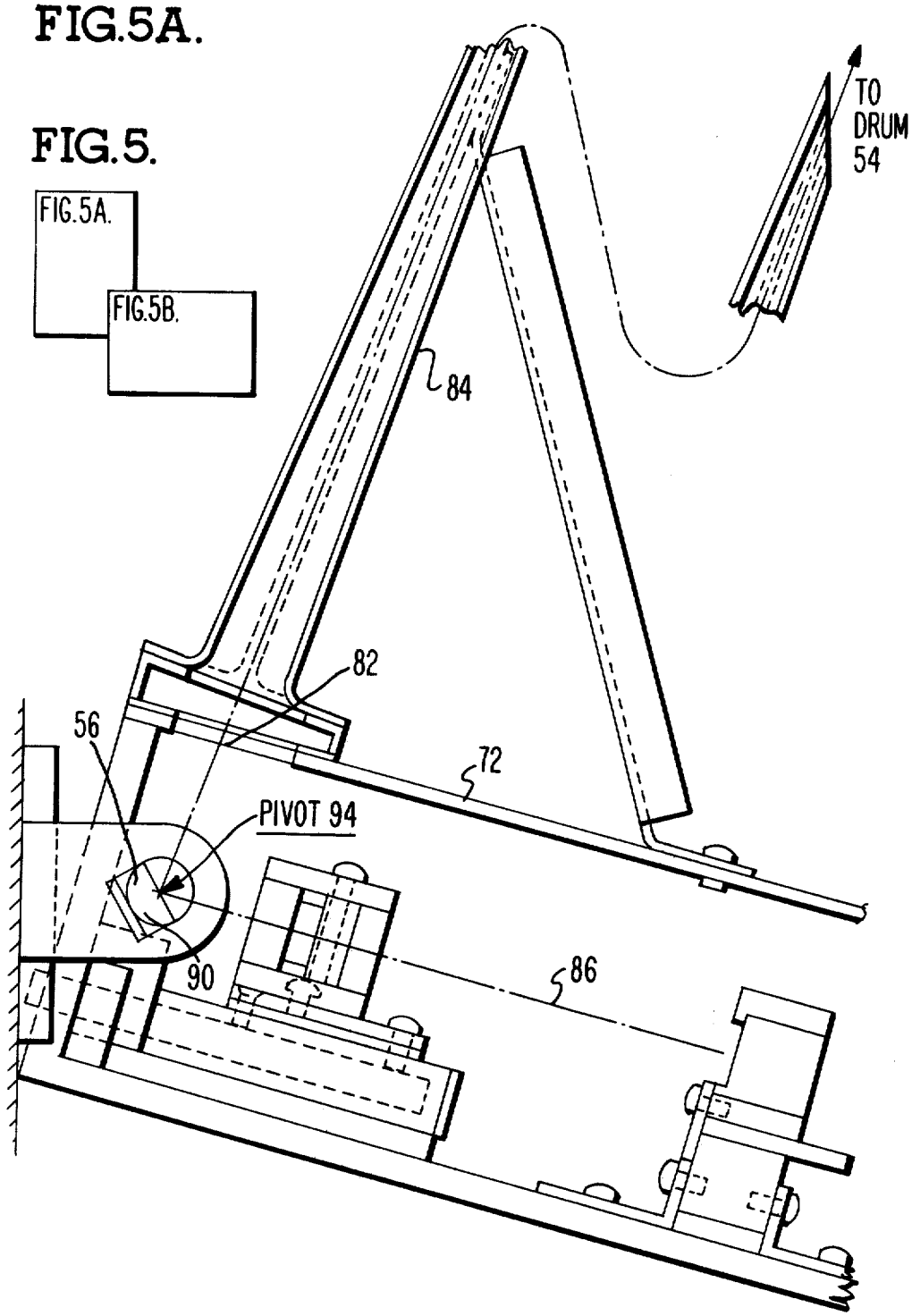
FIG. 5 is a plan of the organization of the views of FIG. 5A and 5B.
FIG. 5A and 5B are side elevational views of the modular structure of the present invention.
Figure 5B:
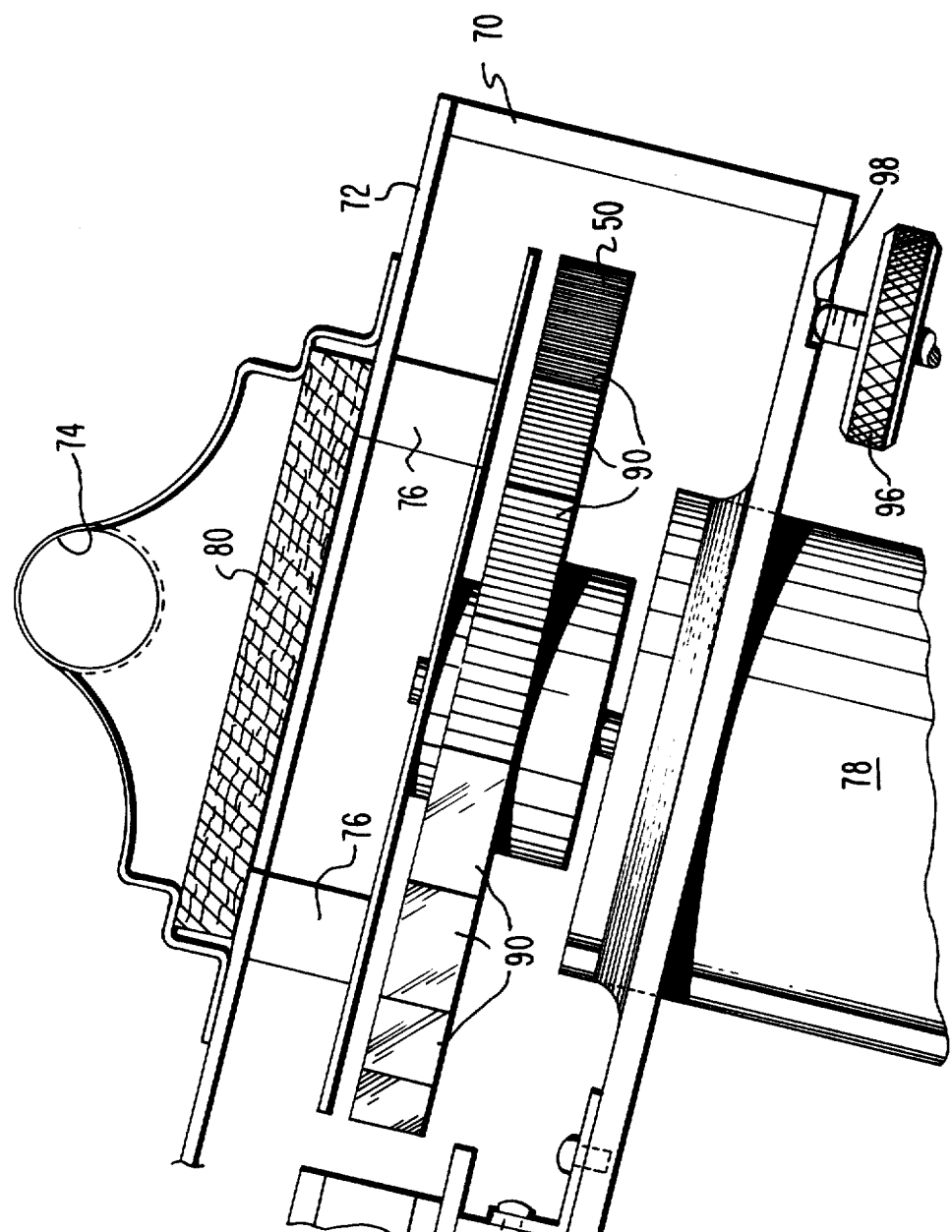

Referring to the detailed drawings FIGS. 4 and 5A and 5B the laser diode 10 is mounted on a copper block 42, as seen from above. The copper block in turn is mounted on a thermo-electric cooler 44 that cools the laser diode 10 to approximately 19 degrees centigrade. The diode 10 is positioned accurately by means of a setup fixture (not shown) relative to a microscope objective 46 so that it is on the center line of the microscope objective optics. The position of the laser diode 10 is thus preset relative to the optical axis before installing it in the laser diode assembly. The diode assembly 10 including cooler 44 is positioned on locating pins (not shown) that locate it so as to avoid any adjustments while in place on the copy machine. From the laser diode 10 the light diverges, more in the horizontal direction than in the vertical direction. The horizontal direction is characterized herein as "the scan direction" and the vertical direction is characterized herein as the "cross scan direction". The light in the scan direction diverges by 30 degrees to the half intensity points on the beam and by 10 degrees to the half intensity points on the beam in the cross scan direction. After the light passes through the microscope objective 46 the beam is collimated assuming that the microscope objective is positioned properly. This divergence of the beam produces a different beam size in the scan direction as opposed to the cross scan direction. The beam will have a larger dimension in the cross scan direction than in the scan direction with about a three to one ratio.

The collimated beam is next passed through a cylindrical lens 48. The first cylindrical lens (similar to lens 30) has power in the cross scan direction and will cause the beam to focus down to a line image on the rotatable polygon 50. It does not have any power in the scan direction. The beam is still collimated in the scan or horizontal direction. The light is then focussed by a horizontal meniscus lens 52 (similar to lens 32) which is the first lens following the polygon 50. Lens 52 has power in the scan direction only so it focusses the wide horizontal dimension of the beam down to a narrow spot on the photoreceptor drum 54 after passing through the third and fourth lenses 58 and 60, respectively, (identical to lenses 34 and 36) which individually have no power in the horizontal direction and, after reflecting off of folding mirror 56 (identical to mirror 38) is in focus both horizontally and vertically on the drum 54. For the cross scan direction the beam is focussed by the third and fourth lenses 58 and 60 which have a cylindrical surface on the first surface 62 and 64, respectively, and a spherical surface 66 and 68 on the second surface, respectively. This pair of lenses (following each other in succession) have power in the cross scan direction and essentially focus the line which is imaged on the polygon 50 to a point in the cross scan direction. The focussing in the other direction is performed by the horizontal meniscus lens 52 which is, as before mentioned, the first lens following the polygon.

The lenses are curved so as to flatten the field. The horizontal meniscus lens 52 is generally curved concave toward the facet of the polygon 50, almost producing a spherical surface with its center at the facet. The curving or bending of the lenses permits the field of focus at the drum 54 to be flat and also improves the scan linearity at the drum.

Each one of the four lenses 43, 52, 62 and 64 is demountably removable relative to each respective frame of reference. This permits cleaning, polishing, replacement and etc. Fixed locating pins 60 are arranged to provide fixed reference for each lens and enables these individual elements to be removed at will and replaced without fear of mislocation.

As can be seen in FIGS. 4, 5A and 5B the complete optical assembly is mounted within a rectangular casting 70 which includes a cover 72 that encloses the top of the casting. The top 72 itself is provided with an air inlet 74 and a flange 76 that comes down close over the polygon 50. Rotation of the polygon 50 by motor 78 creates a vacuum which causes air to be pulled in through a filter 80 that is centered over the top of the polygon 50. The filtered air is forced out inside of the optical casting 70 to create a positive air pressure therein. The air flow is through the casting 70, through an elongated opening 82 (the beam scanning aperture) up through a wedge shaped shroud 84 that is mounted to the top cover 72. The air pressure is maintained such that the positive air flow prevents toner from getting into casting 70. The shroud 84 is angled in such a way as to overhang the assembly, thus the optics is protected from dust, dirt or falling objects from falling directly into the optics.

As can be seen in FIGS. 3 and 4 the beam is folded off of folding mirror 56 FIG. 4 and directed up through the shroud 84 to the photoreceptor drum 54. Beam scanning begins with each facet rotation starting from the left side of the drum 26 FIG. 3. The beam crosses a start of scan detector 88 that is mounted up near the photoreceptor 54. This member provides the timing for the printing that is to be performed. The start of scan pulse provided by detector 88 is used to initiate the print cycle on a scan line and so many counts after that pulse the electronics (not shown) initiates the unloading of the dot line buffers (not shown) that provides the information for each character in bit form.

The polygon 50 which is six inches in diameter is provided with 18 facets 90. Obviously the smaller the number of facets the higher the speed must be. The size of the present polygon was chosen for a thirty page per minute copier so as to keep the RPM of the motor down to a speed around 4900 RPM. At this speed the polygon is expected to last for the life of the machine. The size of the facets 90 were selected to provide uniform illumination across the full scan width. The beam as it falls on a facet 90 is about two tenths of an inch in diameter between half intensity points. This is the so called underfilled case i.e. a facet 90 is underfilled. The intensity of the scanning beam or scanning spot must remain constant across the full scan width. If part of the beam is cut off toward the edge of the facets this results in a decrease of intensity. The width of the facets is designed so as to keep the intensity of the beam constant across a nine and a half inch scan within five percent variation. The nine and a half inch dimension is slightly wider than the width of the drum. The start of the scan detector 88 is included within this dimension.

The complete optical assembly of the present invention is set into the printer/copier machine on a pair of pivots 92. One on each opposite side of casting 70 to the left in FIG. 5A. The center of these pivot points passes through the center 94 of folding mirror 56. The whole assembly is horizontally angularly adjusted by means of screw 96 and slot 98 on the underside of casting 70 located at the opposite end of the casting removed from the pivot points. After the box like assembly 70 is placed into the machine the adjusting screw 96 tilts the whole assembly until the beam falls onto the start to scan detector 88. By having the pivot points pass through the center of folding mirro 56 the plane of focus remains substantially constant or unchanged on the photoreceptor as the assembly is tilted to make the beam fall on the start of scan detector.

What is claimed is:

1. Optical scanning system for laser diode printing apparatus utilizing a folded light beam path comprising,
   a rotatable photoreceptor drum capable of receiving a latent photo-optical image of intelligible indicia thereon,
   solid state laser light beam generating means,
   a rotatable polygon multi-facet mirror assembly for causing said light beam to scan the drum in a horizontal direction,
   optical light collimating means for collimating the beam from said laser light generating means,
   means focussing the light beam from said collimating means into a line image on a facet of said polygon mirror assembly,
   means focussing the scanned light beam to a small dimension in the horizontal direction on the photoreceptor drum,
   multiple optical means in the focus of said scanned light beam providing cross-scan focussing in the vertical direction producing the same function as toroidal lenses but having surface characteristics which are simple and easier to fabricate, and
   reflecting means adjustably disposed in the path of said scanned light beam for folding said light beam back upon itself for impingement on said photoreceptor drum.

2. The invention in accordance with claim 1 wherein said laser diode is provided with a heat sink and wherein cooling means is provided to maintain said diode at a fixed temperature relative to ambient during operation.

3. The invention in accordance with claim 1 wherein said collimating means comprises a compound optical lens assembly including first and second light converging elements, a third spherical light diverging means, fourth light converging means and light generating means located at the focal point of said objective lens assembly producing an elliptically shaped beam corresponding to the differing divergence angles of the beam from the laser diode in planes parallel and perpendicular to the junction of the diode.

4. The invention in accordance with claim 1 wherein said means focussing said light beam into a line image comprises a cylindrical lens with its curved surface oriented toward the compound collimating lens assembly.

5. The invention in accordance with claim 1 wherein said means focussing said light being scanned to a small dimension in the horizontal direction comprises a cylindrical meniscus lens.

6. The invention in accordance with claim 5 wherein said cylindrical meniscus lens is bent or bowed effectively flattening the field of the horizontal focus thereby minimizing any aberrations that might occur.

7. The invention in accordance with claim 1 wherein said multiple optical means providing cross-scan focussing in the vertical direction comprises cylindrical-spherical lenses with the centers of the spherical surfaces located near the facet of the polygon and with power mainly in the vertical or cross-scan direction.

8. The invention in accordacne with claim 7 wherein said cylindrical-spherical lenses are bent or curved in the horizontal direction effectively reducing aberrations in the vertical direction while the field is flattened in the scan direction.

9. The invention in accordance with claim 8 wherein said cylindrical-spherical lenses are each provided with a cylindrically curved surface on the first surface portion thereof and with a spherically curved surface on the second curved surface, thereby essentially focussing the line which is imaged on the polygon assembly to a point in the cross-scan direction.

10. The invention in accordance with claim 1 wherein said means focussing said light being scanned to a small dimension comprises a horizontal cylindrical meniscus lens generally curved concave toward the facet of the polygon assembly.

* * * * *